US012789884B2

(12) United States Patent
Bergmann et al.

(10) Patent No.: US 12,789,884 B2
(45) Date of Patent: Nov. 10, 2026

(54) METHOD FOR PRODUCING A HAPTIC FEEDBACK FORCE AT A STEERING INTENTION INPUT DEVICE

(71) Applicant: ZF Automotive Germany GmbH, Alfdorf (DE)

(72) Inventors: Philipp Bergmann, Duesseldorf (DE); Peter Hambloch, Krefeld (DE); Andreas Kotz, Duisburg (DE)

(73) Assignee: ZF Automotive Germany GmbH, Alfdorf (DE)

( * ) Notice: Subject to any disclaimer, the term of this patent is extended or adjusted under 35 U.S.C. 154(b) by 553 days.

(21) Appl. No.: 18/325,189

(22) Filed: May 30, 2023

(65) Prior Publication Data

US 2023/0382449 A1 Nov. 30, 2023

(30) Foreign Application Priority Data

May 31, 2022 (DE) ......................... 102022205552.7

(51) Int. Cl.
*B62D 5/00* (2006.01)
*B62D 6/00* (2006.01)

(52) U.S. Cl.
CPC ............. *B62D 5/005* (2013.01); *B62D 6/008* (2013.01)

(58) Field of Classification Search
CPC ......... B62D 5/005; B62D 6/005; B62D 6/008
See application file for complete search history.

(56) References Cited

U.S. PATENT DOCUMENTS

| | | | | |
|---|---|---|---|---|
| 12,344,331 | B2 * | 7/2025 | Hambloch | B62D 5/0493 |
| 2019/0322313 | A1 * | 10/2019 | Münch | B60W 60/00 |
| 2020/0023889 | A1 * | 1/2020 | Rohrmoser | B62D 5/0463 |
| 2023/0109469 | A1 * | 4/2023 | Hambloch | B62D 6/008 701/42 |
| 2023/0382449 | A1 * | 11/2023 | Bergmann | B62D 6/008 |
| 2024/0149941 | A1 * | 5/2024 | Gonschorek | B62D 6/008 |

FOREIGN PATENT DOCUMENTS

| | | | | |
|---|---|---|---|---|
| DE | 102010042135 | A1 | 4/2012 | |
| DE | 102018119268 | B4 * | 11/2020 | B62D 6/008 |
| DE | 102020206703 | B3 | 11/2021 | |

OTHER PUBLICATIONS

Strecker et al., Method for determining a rack force for a steering device in a vehicle, Apr. 12, 2012, EPO, DE 10 2010 042 135 A1, Machine Translation of Description (Year: 2012).*
Strecker et al., Method for determining a rack force for a steering device in a vehicle, Apr. 12, 2012, EPO, DE 10 2010 042 135 A1, Claims (Year: 2012).*

* cited by examiner

*Primary Examiner* — James A English
(74) *Attorney, Agent, or Firm* — Kristin L. Murphy

(57) ABSTRACT

In a method for producing a haptic feedback force by setting a manual torque at a steering intention input device of a steering system of a motor vehicle, a first and a second rack force value are obtained from two different models. The rack force values originating from the two models are processed to form a quotient, which determines a feedback force value, by the second rack force value being modified by the quotient, and the feedback force value is transferred to a steering reference torque generator of the steering system, which sets the manual torque at the steering intention input device in dependence on the feedback force value.

14 Claims, 1 Drawing Sheet

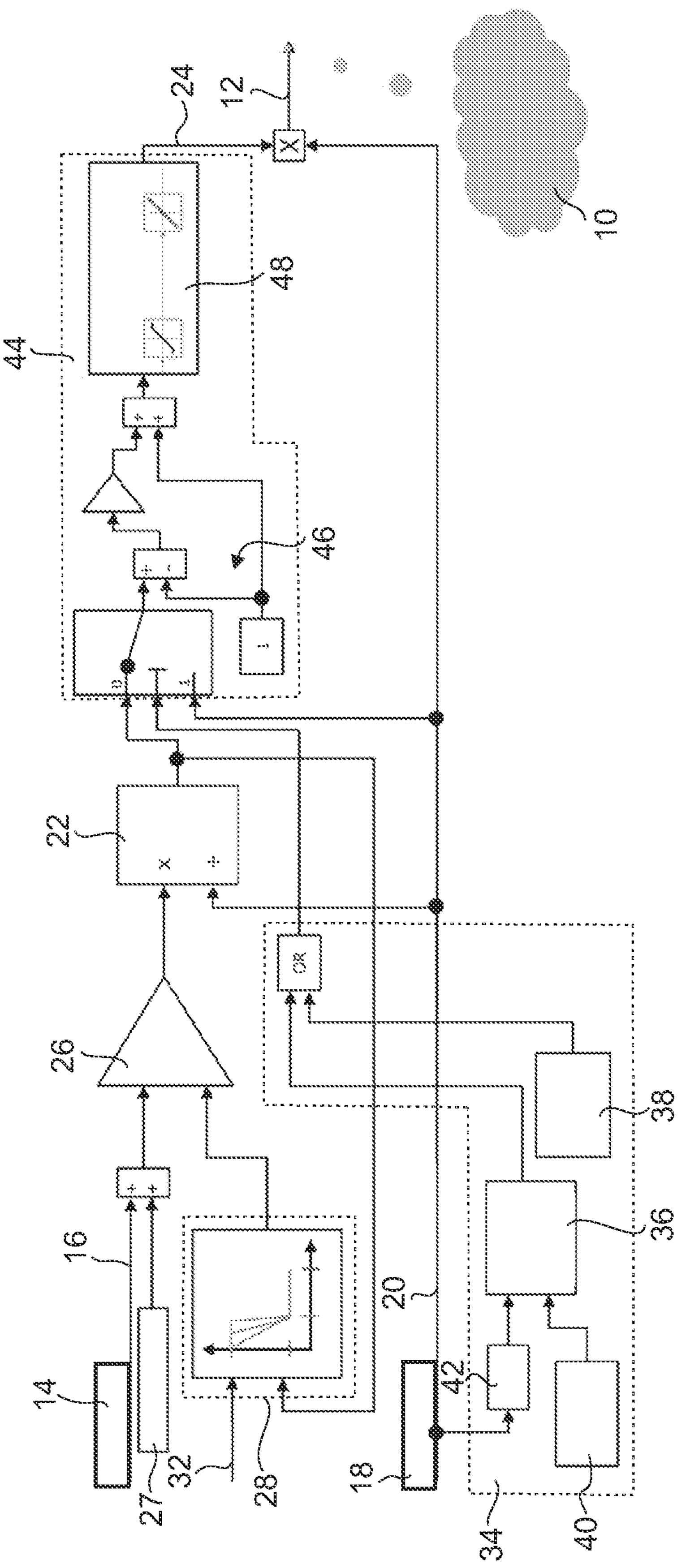
10
12
14
16
18
20
22
24
26
27
28
32
34
36
38
40
42
44
46
48
OR

METHOD FOR PRODUCING A HAPTIC FEEDBACK FORCE AT A STEERING INTENTION INPUT DEVICE

CROSS-REFERENCE TO RELATED APPLICATION

This application claims priority to German Priority Application No. 1020222055527, filed May 31, 2022, the disclosure of which is incorporated herein by reference in its entirety.

TECHNICAL FIELD

The disclosure relates to a method for producing a haptic feedback force at a steering intention input device.

BACKGROUND

In the case of known electromechanical power steering systems (EPS) or completely electronic steering systems (steer-by-wire systems), the driver receives haptic feedback in response to actuating a steering intention input device, for instance a conventional steering wheel, by a steering reference torque generator. This comprises an electric motor, which transmits a torque to the steering intention input device, and thus simulates the steering feeling to which the driver of conventional mechanical steering systems is accustomed.

SUMMARY

What is needed is an arrangement to improve the steering feeling for the driver.

A method for producing a haptic feedback force by setting a manual torque at a steering intention input device of a steering system of a motor vehicle which comprises the following steps:

- obtaining a first and a second rack force value from two different models,
- processing the first and second rack force values originating from the two different models to form a quotient, which determines a feedback force value, by the second rack force value being modified by the quotient, and
- transferring the feedback force value to a steering reference torque generator of the steering system, which sets the manual torque at the steering intention input device in dependence on the feedback force value.

In this way it is possible to allow in normal driving operation, a creation of a natural and comfortable steering feeling, which can, by the use of different models, replicate for example both forces acting on the steering system itself and the influence of the current roadway surface. For this purpose, one of the models may, for example, also include cornering forces on the wheels.

Furthermore, however, it is also possible to use the feedback force to give the driver dynamic feedback, which contains more information useful to him if critical driving states occur, for example when there is understeering or oversteering during cornering or on a smooth roadway surface. For example, on an icy roadway a smaller feedback force value may be produced in order to deter the driver from vigorous steering movements.

The disclosure can be used both in the case of conventional EPS systems and in the case of pure steer-by-wire steering systems.

In one exemplary arrangement, the rack force values of both models are normalized such that the quotient formed is equal to 1 if both models output the same rack force value.

If the quotient is close to 1, this is an indication of a stable driving situation.

The more the models diverge, the more the quotient deviates from 1, which is an indication that there are deviations between, for example, a simplified vehicle model and the behavior of the vehicle, for example when there are smooth roadway conditions or there is understeering or oversteering during cornering. This is accordingly an indication of a potentially critical driving situation. It is conceivable also to use such a deviation of the quotient to instigate automated vehicle systems to intervene in the vehicle control.

In one exemplary arrangement, the quotient is used in a control circuit with an adaptive lowpass filter, which the first rack force value passes through in order to set a cut-off frequency of the lowpass filter in a cut-off frequency module.

The cut-oft frequency of the lowpass filter is for example dependent on a deviation of the quotient from 1 and is lowered if the quotient changes in the direction of 1.

Similarly, a current vehicle speed may also be fed to the cut-off frequency module and used when fixing the cut-off frequency.

If the quotient lies in the range of 1, a low cut-off frequency results in strong filtering, which leads to a comfort mode with a smooth, undisturbed steering feeling. With increasing deviation of the quotient from 1, the filtering effect decreases with increasing cut-off frequency, which leads to a dynamic mode with increased feedback for the driver. In this case, higher frequencies are imposed on the manual torque. On account of this adaptation of the cut-off frequency of the lowpass filter, an automated dynamic adaptation of the steering feedback can be achieved.

In the cut-off frequency module there is stored a lookup table, in which for different parameter values and different quotients corresponding cut-off frequencies are stored. Such a lookup table can be applied in a known way to the respective steering system in tuning runs or can be determined by measurements or simulations, generally before the system goes into mass production, and is not changed in normal driving operation. The lookup table is normally stored in a control unit of the steering system to which the cut-off frequency module has access.

In exemplary implementation, one of the models for determining the rack force value is steering-system-based, for example the model for producing the first rack force value, and the other model, for example the model for producing the second rack force value, is vehicle-data-based. The steering-system-based model includes for example a servomotor torque, a current position of the servomotor, torques in the region of the rack and possibly a pinion and/or modeled parameters of the steering mechanism. The vehicle-data-based model is for example a known linear single-track model and takes into account vehicle parameters such as positive caster and axle geometry, a current steering angle and/or the current vehicle speed.

In one exemplary arrangement, the quotient is scaled and multiplied by the second rack force value in order to obtain the feedback force value.

Before the modification, the quotient may possibly pass through a correction module, which uses for example a fixed tuning function, which is dependent on the driving operating state and adapts the quotient non-linearly over a specified range.

Furthermore, the correction module may possibly carry out a plausibility check, for instance with regard to the continuity of the course of the quotient and the gradient of the quotient, or else with regard to further specified limit values in order to filter out malfunctions of the models before the feedback force value is formed.

In one exemplary arrangement, the quotient is set to 1 by a delimiting module if a delimiting parameter lies within a specified value range. In this way account can be taken of known limits of the models in which the rack force value supplied by the respective model is affected by errors or inaccurate for model-related reasons.

Possible delimiting parameters are an upper limit for an absolute amount of a wheel positioning angle, a position on a front axle of the vehicle, a steering element, a steering wheel, a rack force value from one of the two models and/or an upper limit for a vehicle speed, Such value ranges are excluded from influencing the feedback force value by the delimiting module. The reason for this is that a steering-system-based model does not provide meaningful data when there are small angles in relation to the running-straight-ahead position on account of internal frictional forces of the steering that falsify the result. For example, this creates a dead band around the running-straight-ahead position, in which the data provided by the steering-system-based model are not taken into account. With respect to the vehicle speed, when there are very small vehicle speeds normally free-wheeling or parking operations are taking place, in which the rack force value from the second model is generally inaccurate, and thus would form an implausible quotient.

BRIEF DESCRIPTION OF DRAWINGS

The disclosure is described in more detail below on the basis of an exemplary arrangement with reference to the accompanying drawing, the single FIGURE schematically representing the sequence of the method according to the disclosure.

DETAILED DESCRIPTION

The individual components of the method described may be electronically implemented in any desired suitable control unit in the vehicle or be stored as program code. They are therefore only described here with reference to their function.

A steering system, not represented any more specifically, of a motor vehicle comprises a steering intention input device, which the driver of the motor vehicle actuates in order to influence the driving direction of the motor vehicle. This may be a conventionally known, customary steering wheel. The signal generated at the steering intention input device by the driver's actuation is electronically processed in the steering system and transferred to a servomotor, which moves a rack of the steering system, which is connected to steerable wheels of the motor vehicle, in order to change the wheel angle of the steerable wheels.

Since in such steering systems no direct mechanical connection, or at least no exclusive direct mechanical connection, exists between the steering intention input device and the rack, a haptic feedback force is provided for the driver by a steering reference torque generator 10. This generates a torque at the steering intention input device, and thus generates the haptic feedback force for the driver by way of a manual torque at the steering intention input device.

The steering reference torque generator 10 receives for this purpose a feedback force value 12, which is obtained by the method described below.

A first model 14, which here is a steering-system-based model, determines a first rack force value 16.

A second model 18, which is different from the first model 14 and here is a vehicle-data-based model, determines a second rack force value 20.

The second model 18 carries out a calculation with a feedforward model, with exclusive use of control input variables and without feedback or correction by way of measured variables.

The measured vehicle speed and the measured steering angle are generally sufficient as control inputs for the second model 18 and serve as control inputs for the calculation. The signal thereby calculated reflects the properties of the vehicle model purely synthetically as a result of the current control inputs and does not react to disturbing external influences or model deviations.

By contrast, the first model 14 also carries out a correction of the state variables by way of suitable measured variables recorded.

The first and second rack force values 16, 20 are processed to form the feedback force value 12.

For this purpose, the second rack force value 20 is modified by an adjustment factor 24, which is obtained from a quotient 22 of the first rack force value 16 and the second rack force value 20. The second rack force value 20 is multiplied by the adjustment factor 24, in order to produce the feedback force value 12.

In this example, the rack force values 16, 20 are scaled in a suitable way before the quotient forming, so that a quotient 22 of 1 means that, under the prevailing driving conditions, both models supply the same rack force value. This is the case in a stable driving situation on a roadway with normal skid resistance.

The further the rack force values 16, 20 supplied by the two models 14, 18 deviate from one another, the further away from 1 the quotient 22 becomes and the stronger the effect that the adjustment factor 24 has.

There is a deviation of the two models 14, 18 from one another for example if changed cornering forces act on the wheels, which may be caused for instance by roadway conditions or understeering or oversteering during cornering.

In this example, the quotient forming is carried out such that the quotient 22 becomes smaller if the roadway has less skid resistance, that is to say in the classic case steering becomes lighter. This has the effect of reducing the feedback force value 12, so that the resistance that the steering intention input device offers to the driver's manual force is reduced. This causes the driver to carry out less strong steering movements.

Before the first rack force value 16 is fed to the quotient forming, it passes through an adaptive lowpass filter 26, which filters out higher-frequency components from the signal.

The first rack force value 16 may also additionally include an offset 27, which modifies the first rack force value 16 before it enters the lowpass filter 26.

The lowpass filter 26 has here a variably adjustable cut-off frequency, which is specified by a cut-off frequency module 28.

The quotient forming and the lowpass filter 26 are part of a control circuit, in which the quotient 22 is entered in the cut-off frequency module 28 as an input variable. In this way, the quotient 22, to be more precise its deviation from 1, influences the cut-off frequency of the lowpass filter 26.

Apart from the quotient 22, the cut-off frequency module 28 obtains further suitable parameters that can be included in the adjustment of the cut-off frequency, indicated by arrow 32, for example the current vehicle speed.

In this example, the cut-off frequency module 28 comprises a lookup table, in which the cut-off frequencies of the lowpass filter 26 are stored in predetermined dependences of all relevant parameters and conditions. It generally applies here that the cut-off frequency falls when the quotient 22 approaches 1, that is to say the two models 14, 18 supply substantially the same data for the rack force values 16, 20.

This ensures that, in stable driving situations, in which the vehicle moves on the roadway in a well controlled manner, the manual torque fed back to the driver s steady and uniform and conveys to him a comfortable steering feeling. If, however, the vehicle gets into critical driving situations or the cornering forces on the tire change on account of a roadway surface with a changed friction coefficient, the lowpass filter 26 with an increasing cut-off frequency allows increasingly higher-frequency components to pass through, and these allow an adjustment of the quotient to act more dynamically and to give the driver more information about the current steering behavior of the vehicle, for example the road conditions or the behavior during cornering, to which the driver can react.

In this example there is also a delimiting module 34, which specifies boundary conditions and exceptions for the modification of the second rack force value 20. If one of these conditions or exceptions applies, the quotient 22 is set to 1 independently of the current first rack force value 16.

Here, the delimiting module 34 comprises two components, on the one hand a limiter 36 with respect to a wheel position angle, a position on a front axle of the vehicle, a steering element, a steering wheel itself or rack force values from one of the two models 14, 18, and on the other hand a limiter 38 with respect to the current vehicle speed.

For the limiter 36, a range 40 of the steering position angle, the position on the front axle of the vehicle, the steering element, the steering wheel or the rack force values 16, 20 from one of the two models 14, 18 in relation to running straight ahead, within which the quotient 22 is not taken into account, is specified as the delimiting parameter. This is used to compensate for internal frictional forces in the steering system, which at a small steering angle would falsify the first rack force value 16 of the first model 14. Within this specified range 40, consequently only the second rack force value 20 is taken into account for the feedback force value 12. In order to establish the current value, for example the absolute value 42 may be transferred from the second model 18 to the limiter 36.

For the limiter 38, an upper limit for the current vehicle speed, which is compared with the current vehicle speed (not represented), is used as the delimiting parameter. Below this vehicle-speed upper limit, the second rack force value 20 is not modified.

In the exemplary arrangement shown here, the quotient 22 passes through a correction module 44, in which a tunable scaling 46 of the distance from the value 1 is carried out as well as a plausibility check 48, which for example checks the development over time of the quotient 22 for continuity and gradient, in order to filter out disturbances. This results in the adjustment factor 24.

After passing through the correction module 44, the modified quotient 22 as the adjustment factor 24 is multiplied by the second rack force value 20, from which the feedback force value 12 results.

The invention claimed is:

1. A method for producing a haptic feedback force by setting a manual torque at a steering intention input device of a steering system of a motor vehicle comprising the following steps:

obtaining a first rack force value and a second rack force value from two different models, processing the first and second rack force values originating from the two different models to form a quotient, wherein the quotient defines an adjustment factor that is applied to the second rack force value to directly determine a feedback force value, such that the feedback force value is generated as a function of a deviation of the quotient from a reference value, and transferring the feedback force value to a steering reference torque generator of the steering system, which sets a manual torque at a steering intention input device in dependence on the feedback force value.

2. The method as claimed in claim 1, wherein the quotient is used in a control circuit with an adaptive lowpass filter, wherein the quotient is provided as an input to a cut-off frequency module that dynamically sets a cut-off frequency of the adaptive lowpass filter based on a derivation of the quotient from the reference value.

3. The method as claimed in claim 2, wherein the cut-off frequency of the adaptive lowpass filter is dependent on a deviation of the quotient from 1 and is lowered if the quotient changes in the direction of 1.

4. The method as claimed in claim 1, wherein one of the different models, is steering-system-based and the other of the different models, is vehicle-data-based.

5. The method as claimed in claim 1, wherein the quotient is scaled within a specified range and multiplied by the second rack force value in order to obtain the feedback force value.

6. The method as claimed in claim 5, wherein the quotient passes through a correction module before the multiplication.

7. The method as claimed in claim 1, wherein the quotient is set to 1 by a delimiting module if a delimiting parameter lies within a specified value range.

8. The method as claimed in claim 7, wherein the delimiting parameter is an upper limit for an absolute amount of a wheel positioning angle, a position on a front axle of the vehicle, a steering element, a steering wheel, a rack force value from one of the two models and/or an upper limit for a vehicle speed.

9. The method as claimed in claim 2, wherein one of the model for producing the first rack force value, is steering-system-based and the other model for producing the second rack force value, is vehicle-data-based.

10. The method as claimed in claim 3, wherein one of the model for producing the first rack force value, is steering-system-based and the other model for producing the second rack force value, is vehicle-data-based.

11. The method as claimed in claim 4, wherein the quotient is scaled within a specified range and multiplied by the second rack force value in order to obtain the feedback force value.

12. The method as claimed in claim 11, wherein the quotient passes through a correction module before the multiplication.

13. The method as claimed in claim 12, wherein the quotient is set to 1 by a delimiting module if a delimiting parameter lies within a specified value range.

14. The method as claimed in claim 13, wherein the delimiting parameter is an upper limit for an absolute amount of a wheel positioning angle, a position on a front axle of the vehicle, a steering element, a steering wheel, a rack force value from one of the two models and/or an upper limit for a vehicle speed.

* * * * *